S. L. C. COLEMAN.
VIBRATION CHECK FOR VEHICLES.
APPLICATION FILED SEPT. 13, 1916.
1,299,131.
Patented Apr. 1, 1919.
2 SHEETS—SHEET 1.
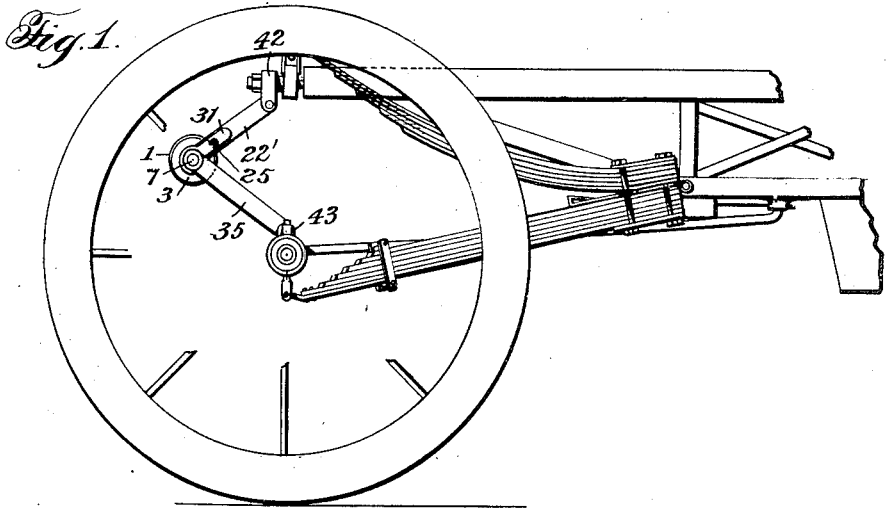
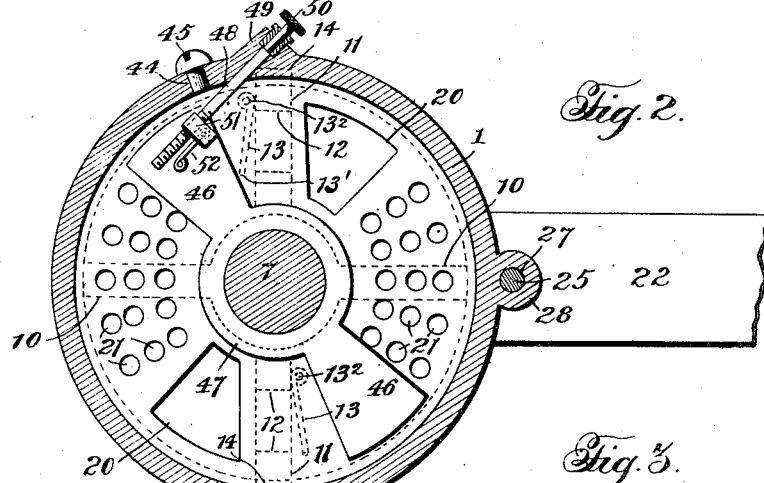
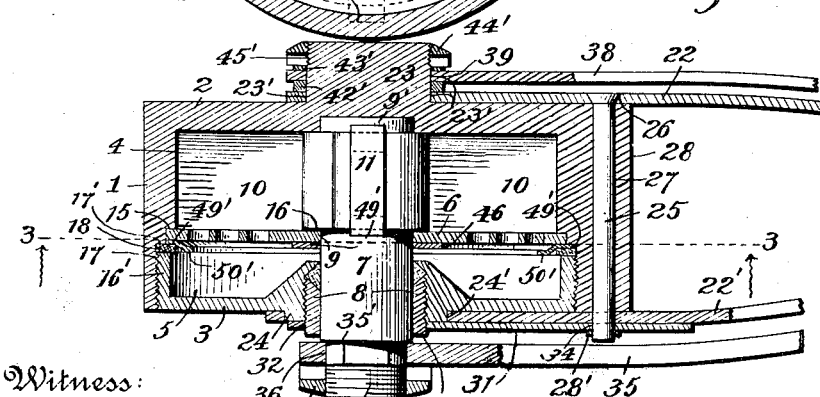

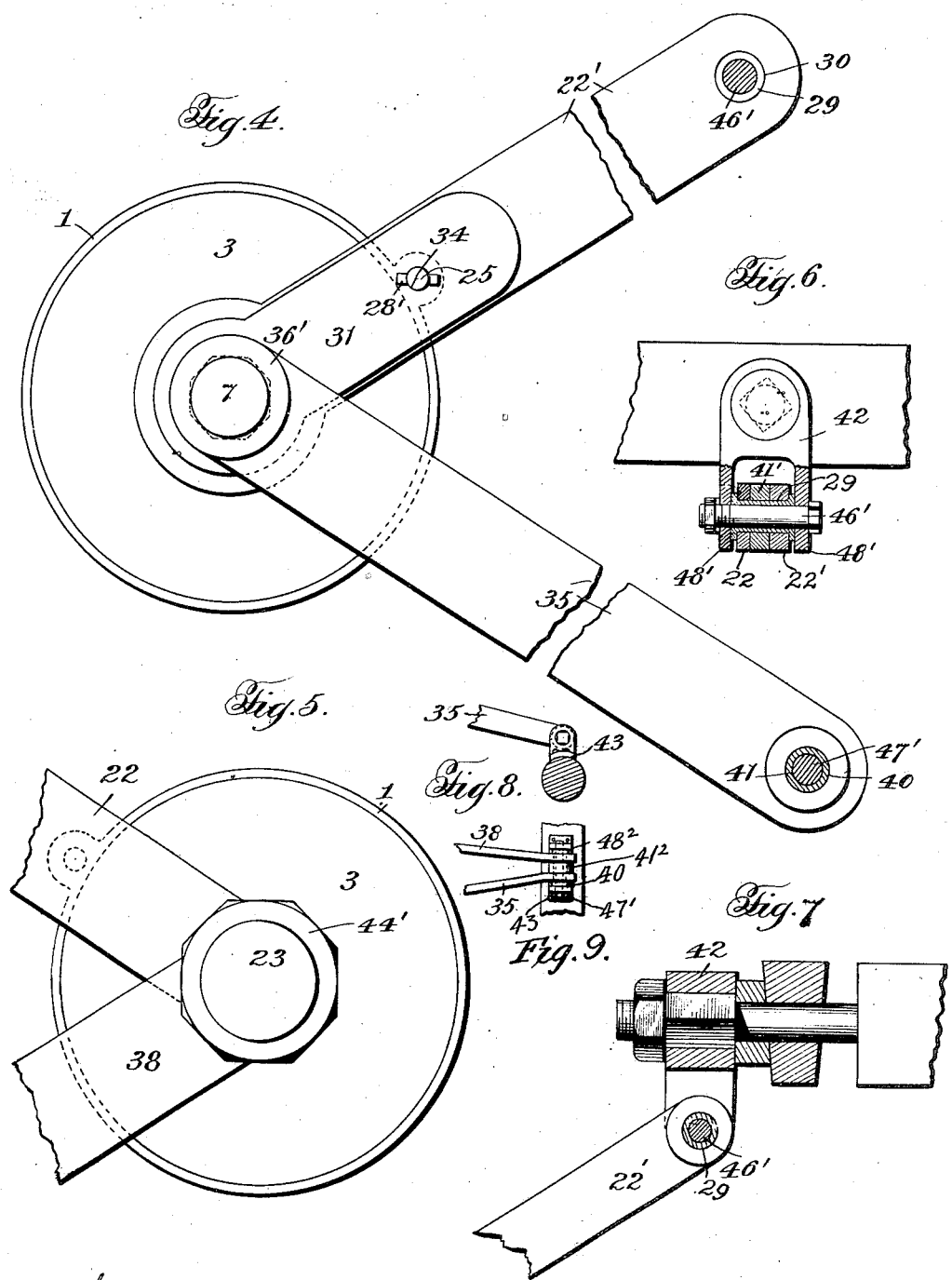

UNITED STATES PATENT OFFICE.

STEPHEN L. CHAUNCEY COLEMAN, OF FREDERICTON, NEW BRUNSWICK, CANADA, ASSIGNOR OF FORTY-NINE ONE-HUNDREDTHS TO CHARLES W. WHELPLEY, OF FREDERICTON, NEW BRUNSWICK, CANADA.

VIBRATION-CHECK FOR VEHICLES.

1,299,131. Specification of Letters Patent. Patented Apr. 1, 1919.

Original application filed September 13, 1916, Serial No. 119,934. Divided and this application filed September 13, 1916. Serial No. 119,937.

*To all whom it may concern:*

Be it known that I, STEPHEN L. C. COLEMAN, a subject of the King of Great Britain, residing at Fredericton, in the Province of New Brunswick, Dominion of Canada, have invented certain new and useful Improvements in Vibration-Checks for Vehicles, of which the following is a specification, reference being had therein to the accompanying drawing.

This invention relates to improvements in devices for preventing excessive vibration of spring supported vehicle bodies, and more particularly to vibration checks of the liquid type, in which a piston operates in a chamber or cylinder containing retarding fluid, the subject matter of this application being a division of an application filed by me September 13, 1916, Serial No. 119,934 for vehicle suspensions.

The object of the invention is to provide an improved vibrating check of this general character of simple and inexpensive construction which will be strong and durable in use, and adapted to check the rebound stroke of the spring at the point of static equilibrium or normal position of rest of the spring against its load by imposing a gradually increasing resistance to the upward thrust or rebound stroke of the spring, so that the spring suspension will not be carried beyond the normal position of rest, excessive vibration prevented, and the springs returned to normal position as quickly as practical after each shock.

The invention aims to provide an improved vibration check of this nature having a wide range in its dampening or retarding action to properly absorb light as well as heavy shocks.

Another object of the invention is to provide an improved check of this character capable of adjustment regarding its retarding action to suit widely differing conditions to be met with in the use of spring gear and vehicles of various kinds.

A further important object of the invention is to provide an improved construction in which the joints or packing glands of the liquid chamber or cylinder and other parts of the device are not exposed to the pressure of the retarding fluid so that leakage of the liquid is prevented.

The invention, with other objects and advantages thereof, and the particular construction, combination and arrangement of parts comprising the same, will be understood from the hereinafter contained detail description when considered in connection with the accompanying drawings forming part hereof and illustrating one embodiment of the invention.

In the drawings:

Figure 1 is a side elevation of a vibration check constructed in accordance with the present invention and illustrating one manner of connecting the same to the parts of a vehicle, the latter being indicated only in a general way.

Fig. 2 is a transverse section taken on the line 3—3 of Fig. 3.

Fig. 3 is a longitudinal section.

Fig. 4 is a side elevation of the check and connecting levers looking from one side of the device.

Fig. 5 is a similar view looking from the opposite side, the levers being shown partly broken away.

Figs. 6 and 7 are detail views illustrating the connection of one pair of levers with the vehicle frame, and Figs. 8 and 9 are detail views of the connection of the other pair of levers with one of the axles.

In the drawings, I have illustrated a preferred embodiment of the invention. The construction shown comprises a casing or cylinder of metal consisting of a cylindrical wall or portion 1, an integral end wall or head 2 and a removable cover plate or head 3. The casing or cylinder is divided into chambers 4 and 5 by a vertical transverse partition 6. Arranged centrally of the casing for rotation is a shaft 7. The shaft extends through a stuffing box 8 on the cover plate 3, through an opening 9 in the partition 6 and has its inner end supported in a bearing 9' on the end wall 2. Secured to the shaft 7 are diametrically oppositely disposed pistons 10 slidably fitting the walls of the chamber 4 and adapted to oscillate within the chamber. 11 designates diametrically oppositely disposed partitions dividing the chamber 4 longitudinally and constituting radial abutments. Each partition is provided with an opening 12 and with a check valve 13 adapted to permit the passage of liquid through the opening from one side of the partition and to prevent the passage of liquid through the opening from the opposite side of the partition. Any suitable form of check valve may be employed for this purpose. The construction shown consists of a plate 13' having a pivotal connection 13² at one edge with the partition at one side thereof, the valve being adapted to lie flat against one side face of the partition to close the passage, and to be opened and closed by the pressure of the liquid. The partitions 11 are shown as separate plates supported in position by engaging grooves 14 in the walls 1 and 2 of the casing and in the transverse partition 6, the inner ends of the partition plates 11 slidably fitting against the shaft 7. The partition 6 is also formed as a separate plate fitting against an annular shoulder 15 on the cylindrical wall 1 and a shoulder 16 on the shaft 7. The several parts are securely held in place in the casing by the removable cover plate 3. The cover plate has an inwardly extending annular flange or collar 16' provided with a threaded outer face engaging an interiorly threaded portion 17 of the cylindrical wall 1, the inner end of the flange or collar 16' being screwed up against a gasket 18 interposed therebetween and an annular shoulder 17' on the cylindrical wall 1.

The vertical transverse partition 6 is provided with relatively large openings 20, one of such openings 20 being located adjacent the inlet side of each of the partitions 11, and said partition 6 is also provided with series of smaller openings 21. The openings 20 are shown in the drawing as segmental shaped, and the openings 21 as circular and disposed in radial rows at intervals about the partition between the openings 20 and the abutments 11.

Rigidly secured to the casing or cylinder are a pair of levers 22, 22' which are disposed opposite to each other at opposite sides of the casing. The end wall 2 of the casing is provided with a projection or boss 23 and the cover plate has a projection or boss 24, and the levers at one end have sockets or openings 23' 24' to fit over the bosses. The boss 23 is cylindrical while the boss 24 has angularly disposed faces, the respective sockets or openings 23', 24' of the levers being correspondingly shaped. The levers are clamped to the sides of the drum by a bolt 25 passing through apertures 26 in the levers and through an opening 27 in an integral extension or boss 28 of the cylindrical part 1 of the casing. The portions of the levers extending outwardly from the drum converge and the levers are connected at their outer ends by a hollow rivet 29 engaging apertures 30 in the levers. 31 designates a short lever provided at one end with a socket opening 32 to fit over the angular faced nut 33 that forms a part of the stuffing box 8. The forward end of the lever 31 is provided with an aperture 34 to engage the bolt 25. The levers 31 and 22' constitute adjusting and locking means for the nut 33 and the screw cover plate 3. As will be understood, in assembling the parts, these levers are engaged respectively with the boss 24 and nut 33 and may be used as wrenches to adjust these parts, after which the levers are positioned to bring their bolt apertures in alinement with the bolt opening 27 of the boss 28, and are secured by the bolt 25, the short lever lying against the lever 22'. 28' designates a cotter pin or the like engaging an aperture in the end of the bolt 25. 35 is a lever rigidly secured at one end to the outer end of shaft 7, the end of the shaft projecting outwardly a slight distance beyond the cover plate 3 and being provided with a shoulder 35'. The lever 35 has a socket or opening 36 at one end thereof to fit over the end of the shaft. The lever 35 is held in place on the end of the shaft against the shoulder 35' by a suitable lock nut 36' engaging a threaded portion 37' of the shaft. At the other end of the cylinder arranged opposite to the lever 35 is a lever 38 having a socket or opening 39 at one end to loosely engage the boss 23. The portions of the levers 35 and 38 that extend outwardly from the drum converge and are connected at their outer ends by a hollow rivet 40, the latter engaging apertures 41 41² in the ends of the levers. 41' designate washers interposed between the ends of the pairs of levers. A washer 42' is interposed between the adjacent ends of levers 38 and 22. 44' designates a nut engaging a threaded portion 45' on the boss 23 to maintain the socket portions of the levers 22 and 38 on the boss 23, and 43' is a washer between the nut 44' and the socket portion of the lever 38.

The device is adapted to be operatively connected with a vehicle by pivotally connecting the outer ends of the levers 22, 22' with the chassis, and the outer ends of the levers 35, 38 with the running gear. As will be understood, the device can be connected with the relatively movable parts of a vehicle at different locations. In the drawings, reference being had particularly to Fig. 1, the levers 22, 22' are shown connected to a bracket 42 on the chassis, and the levers 35, 38, with a bracket 43 on the vehicle axle, the hollow rivets 29 and 40 of the pairs of levers loosely engaging bolts 46' and 47', which engage openings in the spaced ears 48' 48² of the respective brackets.

The casing or cylinder is filled with liquid, preferably oil, through an opening 44 in the cylindrical part 1, the opening being closed by a screw plug 45.

The operation of the device is as follows:

When the axle receives a shock that compresses the vehicle springs, the pair of levers 22, 22′ and the pair of levers 35 and 38 approach each other, and the shaft 7 is caused to move in an anti-clockwise direction, the cylinder or casing rotating in the opposite direction. As the pistons move forwardly the liquid is forced ahead of them, check valves 13 open under the pressure of the liquid and permit the liquid to pass through the openings in the radial abutment walls or partitions 11. Any surplus liquid that cannot readily pass through the openings 12 flows through the relatively large openings 20 in the partition plate 6 and back behind the pistons through the smaller openings 21, no resistance being offered to the compression stroke of the spring. On the return or rebound stroke of the springs, the shaft 7 rotates clockwise and the casing or cylinder moves in the opposite direction, and the pistons in order to advance must force the oil through the smaller openings 21 in the partition plate. The openings 21 provide a passage through the partition 6 for the liquid in front of the pistons, which gradually decreases in size as the pistons approach the closed sides of the radial abutment walls or partitions 11. At first the resistance to the movement of the pistons is small owing to the number of openings 21. As the pistons progress the number of openings 21 of the partition plate become less ahead of the pistons and consequently the resistance is gradually increased until the pistons are brought to rest.

It will be noted that this construction provides for a very wide range of dampening or retardation of gradually increasing intensity. By changing the location, number and size of the openings 21 in the partition plate 11, the time and the amount of retardation can be graduated to any desired degree. The provision of the double piston and abutment arrangement provides a balanced construction in which the strains are distributed and lessens the liability of breakage under exceptionally heavy shocks.

Means is provided by which the resistance or retarding action of the check can be readily adjusted to suit various requirements in the use of springs of different tension and vehicle bodies of different weights. The means for this purpose is a shutter or valve movable over one side face of the partition 6 to close more or less of the openings 21 and vary the size of the passage through the partition. The valve or shutter is shown as consisting of two diametrically oppositely disposed segmental shaped plates 46 connected to a ring 47 that is mounted for rotation on the shaft 7 in the chamber 5 adjacent the partition 6. The valve or shutter is held in position against the outer face of the partition 6 by a retaining ring or collar. The collar has an annular outer portion 49′, and an inner annular offset portion 50′. The outer portion 49′ of the collar fits between the partition 6 and the gasket 18, and the offset portion 50′ overlaps the outer marginal portions of the segmental shaped plates 46 of the valve. 48 designates an adjusting rod or shaft which extends through a stuffing box in the casing and is mounted for rotation in a bearing 49. On the outer end of the rod is a handle part 50. The rod at its inner end has a threaded portion in engagement with a block 51, which has a pivotal link connection 52 with one of the segmental plates 46 of the shutter.

It will be observed that the gland at the stuffing box 8, and the joint between the flange or collar 16′ of the cover plate 3 with the cylindrical part 1 of the casing, are located outside of the piston and abutment chamber 4, and are never under pressure of the retarding liquid so that liability of leakage through the cover joint and stuffing box, is reduced to a minimum. It will also be remarked that the construction is of a very simple, compact and durable nature and that the parts can be conveniently assembled and removed.

In the drawings, I have illustrated a preferred embodiment of the invention, and in this connection I desire it to be understood that variations and minor changes in the particular construction illustrated as will appeal to those skilled in the art, and within the scope of the appended claims, may be made without departing from the broad principles of the invention.

What I claim is:

1. A device of the class described, including a cylinder, a partition separating the cylinder into a piston chamber and a relief chamber at one side thereof, a radial abutment wall in the piston chamber, an oscillating piston in the piston chamber, one of said parts being provided with an opening and a valve permitting the flow of liquid through the opening in one direction, said partition being open to provide a passage between the piston chamber and the relief chamber, said passage decreasing in size as the piston advances on its compression stroke.

2. A device of the class described including a cylinder containing liquid, a partition separating the cylinder into two chambers, a radial abutment wall in one of the chambers provided with an opening and a valve permitting the flow of liquid through the opening in one direction, an oscillating piston in said chamber, the piston and cylinder being adapted to be connected one with the running gear and the other with the body of a vehicle, said partition being open to provide a passage for the liquid from the first mentioned chamber to the other chamber, the passage decreasing in size as the piston approaches the closed side of the abutment, and a passage in the partition located adjacent the inlet side of the radial abutment wall.

3. A device of the class described, including a casing, a partition separating the casing into a piston chamber and a relief chamber at one side thereof, an abutment wall in the piston chamber, a piston in the piston chamber, one of said parts being provided with an opening and a valve permitting the flow of liquid through the opening in one direction, said partition being open to provide a passage at different points along the same between the piston chamber and the relief chamber, said passage decreasing in size as the piston advances on its compression stroke, and a valve device movable along the partition for regulating the extent of said passage.

4. A device of the class described including a cylinder containing liquid, a partition separating the cylinder into two chambers, a radial abutment wall in one of the chambers provided with an opening and a valve permitting the flow of liquid through the opening in one direction, an oscillating piston in said chamber, the piston and cylinder being adapted to be connected one with the running gear and the other with the body of a vehicle, said partition being open to provide a passage for the liquid from the first mentioned chamber to the other chamber, the passage decreasing in area as the piston approaches the closed side of the abutment wall, and an adjustable valve device for varying the extent of the passage through the partition.

5. A device of the class described including a cylinder containing liquid, a partition separating the cylinder into two chambers, a radial abutment wall in one of the chambers provided with an opening and a valve permitting the flow of liquid through the opening in one direction, an oscillating piston in said chamber the piston and cylinder being adapted to be connected one with the running gear and the other with the body of a vehicle, said partition being open to provide a passage for the liquid from the first mentioned chamber to the other chamber, and a rotatable shutter adapted to partially close and regulate the extent of said liquid passage through the partition.

6. A device of the class described, including a cylinder, a transverse partition separating the cylinder into a piston chamber and a relief chamber at one side thereof, a radial abutment wall in the piston chamber, an oscillating piston in the piston chamber, one of said parts being provided with an opening and a valve permitting the flow of liquid through said opening in one direction, said partition having an opening providing a passage between the compression side of the piston and the relief chamber.

7. A device of the class described, including a cylinder, a transverse partition separating the cylinder into a piston chamber and a relief chamber at one side thereof, a radial abutment wall in the piston chamber, an oscillating piston in the piston chamber, one of said parts being provided with an opening and a valve permitting the flow of liquid through said opening in one direction, said partition having an opening providing a passage from the compression side of the piston to the relief chamber, and said partition having an opening providing a passage between the low pressure side of the piston and the relief chamber.

8. A device of the class described, including a cylinder, a transverse partition separating the cylinder into a piston chamber and a relief chamber at one side thereof, a radial abutment wall in the piston chamber, an oscillating piston in the piston chamber, one of said parts being provided with an opening and a valve permitting the flow of liquid through the opening in one direction, said partition having a series of openings providing passages for liquid from one chamber to the other, said openings being disposed in radial rows at intervals along the partition.

9. A device of the class described, including a cylinder, a partition separating the cylinder into a piston chamber and a relief chamber at one side thereof, a radial abutment wall in the piston chamber, an oscillating piston in the piston chamber, one of said parts being provided with an opening and a valve permitting the flow of liquid through said opening in one direction, said partition having a plurality of openings to permit the passage of liquid from one of said chambers to the other, and a plate adjustable over the partition to close some of said openings.

10. A device of the class described, including a cylinder, one end of the cylinder being removable and the cylinder having intermediate its ends an annular shoulder at the interior thereof, a transverse partition fitting against the annular shoulder and separating the cylinder into a piston chamber and a relief chamber, the partition having an opening to permit the passage of liquid from one chamber to the other, an oscillating piston in the piston chamber, a plate detachably secured in the piston chamber and constituting a radial abutment, said plate engaging grooves in one end wall and in the cylindrical wall of the chamber, and a groove in said partition.

11. A device of the class described, including a cylinder, one end of the cylinder being removable and the cylinder having intermediate its ends at the interior thereof an annular shoulder, a transverse partition fitting against the annular shoulder and separating the cylinder into a piston chamber and a relief chamber, the partition having an opening to permit the passage of liquid from one chamber to the other, a plate engaging grooves in one end wall and the cylindrical wall of the cylinder, and in said partition, said plate extending radially and constituting an abutment in the piston chamber, an oscillating piston in the piston chamber, the removable end of the cylinder being provided with an annular flange extending within the cylinder adjacent one side of the partition and serving to support the partition in position against the annular shoulder.

12. A device of the class described, including a cylinder, a partition separating the cylinder into a piston chamber and a relief chamber at one side thereof, a radial abutment wall in the piston chamber, an oscillating piston in the piston chamber, one of said parts being provided with an opening and a valve permitting the flow of liquid through the opening in one direction, said partition having an opening providing a passage for liquid from one chamber to the other, a shaft mounted centrally of the cylinder for rotation and connected with the oscillating piston, and a valve comprising a ring rotatably engaging the shaft, and a plate carried by the ring and movable over the partition to partially close the opening therein.

13. A device of the class described, including a cylinder, a partition separating the cylinder into a piston chamber and a relief chamber at one side thereof, a radial abutment wall in the piston chamber, an oscillating piston in the piston chamber, one of said parts being provided with an opening and a valve permitting the flow of liquid through the opening in one direction, said partition having an opening providing a passage for liquid from one of the chambers to the other, a shaft mounted centrally of the cylinder for rotation and connected with the oscillating piston, and a valve comprising a plate supported for rotation upon the shaft and adapted to be moved over the partition to partially close the opening therein, and adjusting means for the valve including an operating rod rotatably mounted in the wall of the cylinder and extending to the exterior thereof, a part in screw threaded engagement with the inner end of said operating rod, and a connection between said part and the valve plate.

14. A device of the class described, including a cylinder, a partition separating the cylinder into a piston chamber and a relief chamber at one side thereof, a radial abutment wall in the piston chamber, an oscillating piston in the piston chamber, one of said parts being provided with an opening and a valve permitting the flow of liquid through the opening in one direction, said partition having an opening providing a passage for liquid from one of the chambers to the other, a shaft mounted centrally of the cylinder for rotation and connected with the oscillating piston, and a valve comprising a plate supported for rotation upon the shaft and adapted to be moved over the partition to regulate the size of the opening in the partition, and adjusting means for the valve including an operating rod rotatably mounted in the wall of the cylinder and extending to the exterior thereof, a nut in threaded engagement with the inner end of the operating rod, and a pivotal link connection between said nut and the valve plate.

15. A device of the class described, including a cylinder, a partition separating the cylinder into a piston chamber and a relief chamber at one side thereof, an oscillating piston in the piston chamber, one of said parts being provided with an opening and a valve permitting the flow of liquid through the opening in one direction, said partition having a series of openings to permit the passage of liquid from one chamber to the other, said openings being disposed in radial rows at intervals along the partition, a shaft mounted centrally of the casing for rotation and connected with the oscillating piston, and a valve including a ring rotatably engaging said shaft, and a segmental shaped plate carried by the ring and movable over the partition to close some of the openings therein.

16. A device of the class described including a cylinder containing liquid, a partition separating the cylinder into two chambers, diametrically oppositely disposed radial abutment walls in one of the chambers, each of said abutment walls having an opening and a valve permitting the flow of liquid through the opening in one direction, said partition having series of openings between the radial abutment walls to permit the passage of liquid from one chamber to the other, a shaft mounted for rotation in the casing, diametrically oppositely disposed oscillating pistons in said chamber secured to the shaft, the shaft and cylinder being adapted to be connected one with the running gear and the other with the body of a vehicle, and a valve including a ring mounted for rotation upon the shaft, and diametrically oppositely disposed segmental shaped plates carried by the sleeve, said plates being adapted to be moved over the partition to close some of the sets of openings therein.

17. A device of the class described, including a cylinder, a partition separating the cylinder into a piston chamber and a relief chamber at one side thereof, a radial abutment wall in the piston chamber, an oscillating piston in the piston chamber, one of said parts being provided with an opening and a valve permitting the flow of liquid through the opening in one direction, said partition being provided with an opening at the compression side of the piston, and with an opening larger than the first mentioned opening at the low pressure side of the piston.

18. A device of the class described including a chamber containing liquid, a partition separating the cylinder into two chambers, a radial abutment wall in one of the chambers provided with an opening and a valve permitting the flow of liquid through the opening in one direction, an oscillating piston in said chamber, said partition being provided with a relatively large vent opening adjacent the inlet side of the radial abutment, and a plurality of relatively small openings located at intervals along the partition between the first mentioned opening and the abutment, said piston and cylinder being adapted to be connected one with the running gear and the other with the body of a vehicle.

19. A device of the class described including a cylinder containing liquid, a partition separating the cylinder into two chambers, a plurality of radial abutment walls in one of the chambers, each of said abutment walls being provided with an opening and a valve permitting the flow of liquid through the opening in one direction, a shaft supported for rotation centrally of the cylinder, a plurality of pistons secured to said shaft for oscillation within said chamber, said partition having openings intermediate the radial abutments to permit the flow of liquid from one chamber to the other, the cylinder and the shaft being adapted to be connected one with the running gear and the other with the body of a vehicle.

20. A device of the class described, including a cylinder, a radial abutment wall in the cylinder, an oscillating piston in the cylinder, one of said parts being provided with an opening and a valve permitting the flow of liquid through said opening in one direction, a shaft supported centrally of the cylinder for rotation with one end thereof extending beyond one end wall of the cylinder, said shaft being connected with the oscillating piston, and connecting means, said connecting means including a projection on each end wall of the cylinder, oppositely disposed levers arranged at opposite sides of the cylinder and fitting over said projections, said levers being provided with openings intermediate their ends and the cylinder wall at its exterior having an opening extending longitudinally thereof, and a single bolt member extending longitudinally of the cylinder and engaging the opening in the cylinder wall and the openings in the levers, said bolt member serving to clamp the levers against the end walls of the cylinder.

21. A device of the class described, including a cylinder having a removable end wall, said end wall having a screw threaded portion engaging a threaded portion of the cylinder, a radial abutment wall in the cylinder, an oscillating piston in the cylinder, one of said parts being provided with an opening, and a valve permitting the flow of liquid through said opening in one direction, a shaft supported centrally of the cylinder for rotation with one end thereof extending beyond an end wall of the cylinder, said shaft being connected with the oscillating piston, and connecting means, said connecting means including projections on the end walls of the cylinder, oppositely disposed levers located at opposite ends of the cylinder and fitting over said projections, a bolt extending through openings in the cylinder wall and the levers, one of said levers constituting an adjusting and retaining means for the removable end wall of the cylinder.

22. A device of the class described, including a cylinder having a removable end wall, said end wall having a screw threaded portion engaging a threaded portion of the cylinder, a radial abutment wall in the cylinder, an oscillating piston in the cylinder, one of said parts being provided with an opening, and a valve permitting the flow of liquid through said opening in one direction, a shaft supported centrally of the cylinder for rotation with one end thereof extending beyond an end wall of the cylinder, said shaft being connected with the oscillating piston, and connecting means, said connecting means including projections on the end walls of the cylinder, a pair of oppositely disposed levers located at opposite ends of the cylinder and fitting over said projections, a bolt connecting the levers to the cylinder forwardly of said projections, a lever fixedly secured to the outer end of said shaft at one side of the cylinder, and a lever disposed opposite to said last mentioned levers at the other side of the cylinder and having one end loosely fitting over the projection at that end of the cylinder, said last mentioned levers being connected together near their outer ends.

23. A device of the class described, including a cylinder having a removable end wall provided with a threaded portion engaging a threaded portion of the cylinder, said removable end wall being provided with a stuffing box including an adjusting nut, a radial abutment wall in the cylinder, an oscillating piston in the cylinder, one of said parts being provided with an opening and a valve permitting the flow of liquid through the opening in one direction, a shaft supported centrally of the cylinder for rotation with one end thereof extending through the stuffing box beyond the removable end wall, said shaft being connected with the oscillating piston, and connecting means including a projection on each end wall of the cylinder, oppositely disposed levers located at opposite ends of the cylinder and having openings at one end fitting over said projections, a lever arm having a socket opening at one end fitting over the nut of the stuffing box, and a bolt engaging the cylinder and openings in the levers and connecting the same together, said lever arm and one of the pair of first mentioned levers constituting adjusting and retaining means respectively for the removable end wall and the nut of the stuffing box.

24. A device of the class described, including a casing, a partition separating the casing into a piston chamber, and a relief chamber extending along one side thereof, said piston chamber having an abutment wall, a piston in the piston chamber, one of said parts being provided with an opening and a valve permitting the flow of liquid through the opening in one direction, said partition having a series of openings located at intervals along the same providing passages for liquid from one chamber to the other.

25. A device of the class described, including a cylinder, a partition separating the cylinder into a piston chamber and a relief chamber at one side thereof, a radial abutment wall in the piston chamber, an oscillating piston in the piston chamber, one of said parts being provided with an opening and a valve permitting the flow of liquid through the opening in one direction, said partition having an opening to permit the passage of liquid through one chamber to the other, a shaft supported centrally of the cylinder for rotation, a plate supported for rotation upon said shaft, a ring arranged adjacent the partition and provided with an offset portion supporting said plate at the outer edge portion thereof, said plate being adjustable over the partition to regulate the extent of the opening in the partition.

26. A device of the class described, including a cylinder, a partition separating the cylinder into a piston chamber and a relief chamber at one side thereof, a radial abutment wall in the piston chamber, an oscillating piston in the piston chamber, one of said parts being provided with an opening and a valve permitting the flow of liquid through said opening in one direction, said partition being open to provide a passage between the chambers, a ring located at one side of the partition and provided with a portion spaced from the partition, and a plate slidably fitting between the partition and said portion of the ring and supported thereby for rotary adjustment over the partition to regulate the extent of said passage.

In testimony whereof I hereunto affix my signature in the presence of two witnesses.

S. L. CHAUNCEY COLEMAN.

Witnesses:
   CHAS. W. WHELPLEY,
   W. W. O. FENETY.

Copies of this patent may be obtained for five cents each, by addressing the "Commissioner of Patents, Washington, D. C."